United States Patent
Shiraishi et al.

(10) Patent No.: US 12,157,972 B2
(45) Date of Patent: Dec. 3, 2024

(54) TEXTILE PRINTING INK

(71) Applicant: Konica Minolta, Inc., Tokyo (JP)

(72) Inventors: Masaharu Shiraishi, Yokohama (JP); Masaki Nakamura, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 156 days.

(21) Appl. No.: 17/835,279

(22) Filed: Jun. 8, 2022

(65) Prior Publication Data
US 2023/0002967 A1 Jan. 5, 2023

(30) Foreign Application Priority Data

Jun. 17, 2021 (JP) ................. 2021-100820

(51) Int. Cl.
*D06P 5/30* (2006.01)
*C08L 67/07* (2006.01)
(Continued)

(52) U.S. Cl.
CPC ............... *D06P 5/30* (2013.01); *C08L 67/07* (2013.01); *C08L 77/12* (2013.01); *C09D 11/38* (2013.01); *C08L 2201/52* (2013.01)

(58) Field of Classification Search
CPC .. D06P 5/30; D06P 1/525; D06P 1/647; D06P 1/445; D06P 1/54; C08L 67/07; C08L 77/12; C08L 2201/52; C09D 11/38
(Continued)

(56) References Cited

U.S. PATENT DOCUMENTS

| | | | |
|---|---|---|---|
| 2004/0202838 A1* | 10/2004 | Uerz | B41M 7/0027 428/203 |
| 2006/0100306 A1* | 5/2006 | Yau | C09D 11/40 523/160 |

(Continued)

FOREIGN PATENT DOCUMENTS

| | | |
|---|---|---|
| JP | 2011-116859 A | 6/2011 |
| JP | 2020-044751 A | 3/2020 |
| WO | 2022/046112 A1 | 3/2022 |

OTHER PUBLICATIONS

Extended European Search Report dated Dec. 23, 2022, for European Patent Application No. 22177109.0.

*Primary Examiner* — Jason S Uhlenhake
*Assistant Examiner* — Alexander D Shenderov
(74) *Attorney, Agent, or Firm* — LUCAS & MERCANTI, LLP

(57) ABSTRACT

A textile printing ink including polymer particles, contains: first polymer particles; second polymer particles having a weight average molecular weight different from a weight average molecular weight of the first polymer particles; and a binding aid that crosslinks the polymer particles, on a surface, inside, or outside of the first polymer particles and the second polymer particles, wherein when a weight average molecular weight of a polymer contained in the first polymer particles is denoted by $HMw_1$ and a weight average molecular weight of a polymer contained in the second polymer particles is denoted by $LMw_2$, a ratio ($LMw_2/HMw_1$) of the weight average molecular weight of the polymer of the second polymer particles to the weight average molecular weight of the polymer of the first polymer particles is in a range of 0.01 to 0.20.

7 Claims, 1 Drawing Sheet

(51) Int. Cl.
*C08L 77/12* (2006.01)
*C09D 11/38* (2014.01)

(58) Field of Classification Search
USPC .......................................... 347/100
See application file for complete search history.

(56) References Cited

U.S. PATENT DOCUMENTS

| | | | | |
|---|---|---|---|---|
| 2006/0100307 | A1* | 5/2006 | Uerz | C09D 11/40 |
| | | | | 523/160 |
| 2009/0246480 | A1* | 10/2009 | Saito | C09D 11/101 |
| | | | | 522/42 |
| 2012/0190788 | A1* | 7/2012 | Hiratani | C09D 11/328 |
| | | | | 977/773 |
| 2015/0375528 | A1* | 12/2015 | Kitagawa | D06P 1/44 |
| | | | | 428/196 |

* cited by examiner

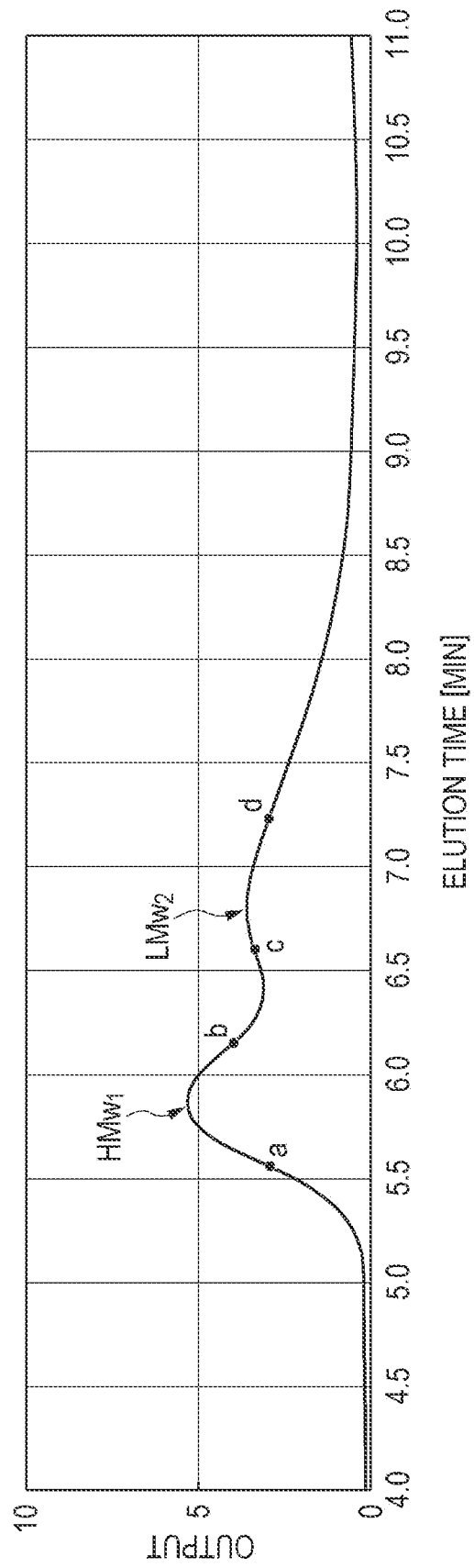

TEXTILE PRINTING INK

The entire disclosure of Japanese patent Application No. 2021-100820, filed on Jun. 17, 2021, is incorporated herein by reference in its entirety.

BACKGROUND

Technological Field

The present invention relates to a textile printing ink, and more particularly to a textile printing ink that can prevent stickiness, has good fastness to rubbing, and improve color reproducibility and texture.

Description of the Related Art

As a method for textile printing of an image such as a letter, a picture, or a pattern on a fabric such as a woven fabric or a nonwoven fabric, in addition to a screen textile printing method and a roller textile printing method, an inkjet textile printing method that allows textile printing substantially without a plate by image processing using a computer has been widely used in recent years.

The textile printing of the fabric by the inkjet textile printing method includes a step of ejecting ink from an inkjet head to land the ink on the fabric, a step of applying steam to the fabric on which the ink has landed to fix a dye contained in the ink to fibers of the fabric, and a step of washing the fabric to which the steam has been applied to remove the dye that has not been fixed.

As an ink used in such an inkjet textile printing method, for example, JP 2020-44751 A discloses an aqueous ink containing first polymer particles formed of a polyester polymer (also referred to as "polyester resin") and an acrylic polymer (also referred to as "acrylic resin") and second polymer particles formed of a urethane polymer having a weight average molecular weight of 300,000 or more.

However, the aqueous ink, which contains a urethane polymer, has a problem that color loss occurs in about three years.

JP 2011-116859 A discloses an ink containing ink-dispersible polymer particles in an amount of 2.0 times or more and 10 times or less the amount of pigment particles, wherein the ink-dispersible polymer particles contained in the aqueous inkjet ink have a weight average molecular weight of 20,000 or more and 100,000 or less, and a glass transition temperature of 20° C. or higher and lower than 80° C.

However, the ink described in JP 2011-116859 A uses one type of latex and is not crosslinked, and thus has problems of stickiness and poor fastness to rubbing.

SUMMARY

The present invention has been made in view of the above problems and circumstances, and an object of the present invention is to provide a textile printing ink that can prevent stickiness, has good fastness to rubbing, and can improve color reproducibility and texture.

To achieve the abovementioned object, according to an aspect of the present invention, there is provided a textile printing ink comprising polymer particles, and the textile printing ink reflecting one aspect of the present invention contains first polymer particles; second polymer particles having a weight average molecular weight different from a weight average molecular weight of the first polymer particles; and a binding aid that crosslinks the polymer particles, on a surface, inside, or outside of the first polymer particles and the second polymer particles, wherein when a weight average molecular weight of a polymer contained in the first polymer particles is denoted by $HMw_1$ and a weight average molecular weight of a polymer contained in the second polymer particles is denoted by $LMw_2$, a ratio ($LMw_2/HMw_1$) of the weight average molecular weight of the polymer of the second polymer particles to the weight average molecular weight of the polymer of the first polymer particles is in a range of 0.01 to 0.20.

BRIEF DESCRIPTION OF THE DRAWINGS

The advantages and features provided by one or more embodiments of the invention will become more fully understood from the detailed description given hereinbelow and the appended drawing which are given by way of illustration only, and thus are not intended as a definition of the limits of the present invention:

FIGURE is a view for explaining a method for measuring weight average molecular weights of first polymer particles and second polymer particles according to an embodiment of the present invention.

DETAILED DESCRIPTION OF EMBODIMENTS

Hereinafter, one or more embodiments of the present invention will be described with reference to the drawings. However, the scope of the invention is not limited to the disclosed embodiments. A textile printing ink according to an embodiment of the present invention is a textile printing ink containing polymer particles, the textile printing ink containing first polymer particles; second polymer particles having a weight average molecular weight different from a weight average molecular weight of the first polymer particles; and a binding aid that crosslinks polymer particles, on a surface, inside, or outside of the first polymer particles and the second polymer particles, wherein when a weight average molecular weight of a polymer contained in the first polymer particles is denoted by $HMw_1$ and a weight average molecular weight of a polymer contained in the second polymer particles is denoted by $LMw_2$, a ratio ($LMw_2/HMw_1$) of the weight average molecular weight of the polymer of the second polymer particles to the weight average molecular weight of the polymer of the first polymer particles is in a range of 0.01 to 0.20.

This feature is a technical feature common to or corresponding to each of the following embodiments.

According to an embodiment of the present invention, from the viewpoint of exhibiting the effect of an embodiment of the present invention, the second polymer particles are preferably contained in an amount of 1 to 100 parts by mass with respect to 100 parts by mass of the first polymer particles because the ratio of the weight average molecular weight can be controlled to the above value of the ratio.

The glass transition temperatures (Tg) of the first polymer particles and the second polymer particles are preferably −35° C. or lower from the viewpoint of binding the pigment and the fiber.

The binding aid is preferably a crosslinkable monomer contained in each of the first polymer particles and the second polymer particles, and a crosslinking agent contained in the textile printing ink from the viewpoint that crosslinking of both polymer particles by the crosslinkable monomer of each polymer particle and the crosslinking agent provides excellent texture and color reproducibility, and can prevent stickiness and improve fastness to rubbing.

The first polymer particles and the second polymer particles each preferably contain a structural portion derived from a crosslinkable monomer, and the structural portion derived from a crosslinkable monomer is preferably contained in an amount of 0.1 to 30% by mass with respect to a total amount of the first polymer particles and the second polymer particles from the viewpoint of texture and fastness to rubbing.

The average particle sizes of the first polymer particles and the second polymer particles are preferably in a range of 30 to 250 nm from the viewpoint of injection by inkjet.

The textile printing ink preferably contains the first polymer particles and the second polymer particles in an amount of 0.1 to 30% by mass from the viewpoint that both polymer particles are present in gaps between fibers of the fabric, pigment particles are likely to be uniformly distributed on the surface of the fibers, and color reproducibility is excellent.

Hereinafter, an embodiment of the present invention, components thereof, and modes and aspects for carrying out the present invention will be described. In the present application, "to" is used to mean including numerical values described before and after the "to" as a lower limit and an upper limit.

[Outline of Textile Printing Ink According to Embodiment of Present Invention]

A textile printing ink according to an embodiment of the present invention is a textile printing ink containing polymer particles, the textile printing ink containing first polymer particles; second polymer particles having a weight average molecular weight different from a weight average molecular weight of the first polymer particles; and a binding aid that crosslinks polymer particles, on a surface, inside, or outside of the first polymer particles and the second polymer particles, wherein when a weight average molecular weight of a polymer contained in the first polymer particles is denoted by $HMw_1$ and a weight average molecular weight of a polymer contained in the second polymer particles is denoted by $LMw_2$, a ratio ($LMw_2/HMw_1$) of the weight average molecular weight of the polymer of the second polymer particles to the weight average molecular weight of the polymer of the first polymer particles is in a range of 0.01 to 0.20.

In an embodiment of the present invention, the content state of the binding aid according to an embodiment of the present invention is preferably at least the following three aspects:

(i) the binding aid is completely contained inside the first polymer particles or the second polymer particles, does not appear on the surface of the polymer particles, and can appear on the surface of the polymer particles by an external action;

(ii) a part of a structural portion of the molecule of the binding aid is contained on the surface or inside of the first polymer particles or the second polymer particles, and a structural portion having a crosslinkable group appears on the surface of the particles; and (iii) the binding aid is contained in the ink outside the first polymer particles or the second polymer particles.

Among them, the states (ii) and (iii) are preferably used in combination. The binding aid according to an embodiment of the present invention is preferably, for example, a crosslinkable monomer contained in each of the first polymer particles and the second polymer particles and a crosslinking agent contained in the textile printing ink.

Examples of another binding aid include a reactive species having a catalytic action that promotes the reaction of the crosslinkable polymer and the crosslinking agent.

The ratio of the weight average molecular weight ($LMw_2/HMw_1$) is in a range of 0.01 to 0.20, and more preferably 0.05 to 0.15.

The weight average molecular weight of the first polymer particles is larger than that of the second polymer particles, and the first polymer particles are a high-molecular weight polymer. The weight average molecular weight of the second polymer particles is smaller than that of the first polymer particles, and the second polymer particles are a low-molecular weight polymer.

The weight average molecular weight ($HMw_1$) of the first polymer particles is preferably in a range of 100,000 to 3,000,000. The weight average molecular weight of the second polymer particles is a value at which the ratio ($LMw_2/HMw_1$) of the weight average molecular weight falls within a range of 0.01 to 0.20 according to the weight average molecular weight of the first polymer particles.

<Method for Measuring Weight Average Molecular Weight>

The weight average molecular weight of the polymer contained in the first polymer particles or the second polymer particles was measured with gel permeation chromatography (GPC) apparatus.

Specifically, a synthesized polymer particle dispersion or ink is dried and dissolved in tetrahydrofuran (THF) so as to be a 1% solution. Next, the dissolved 1% THF solution is passed through a membrane filter having a pore size of 0.45 μm to prepare a sample solution (sample).

Thereafter, the weight average molecular weight was measured under the following conditions. Specifically, for example, using a GPC apparatus HLC-8220GPC (manufactured by Tosoh Corporation) and a column "TSKgel Super H3000" (manufactured by Tosoh Corporation), THF as a carrier solvent (eluent) is allowed to flow at a flow rate of 0.6 mL/min while maintaining the column temperature at 40° C. Together with the carrier solvent, 100 μL of the prepared sample solution is injected into the GPC apparatus, and the sample is detected by a differential refractive index detector (RI detector). Then, the molecular weight distribution of the sample is calculated using the calibration curve measured using ten samples of monodispersed polystyrene standard particles.

Here, as a method for confirming the first polymer particles and the second polymer particles contained in the ink, for example, in the measurement curve as shown in FIGURE, the first uppermost point (peak top) of a first convex of the curve that rises from the baseline, passes through the inflection point a, reaches the first uppermost point, and then falls is defined as $HMw_1$ of the first polymer. Then, the curve falls from the first uppermost point, passes through the inflection point b, further falls, reaches the lowermost point, and further rises to form a concave. The second uppermost point of a second convex of the curve that rises from the lowermost point of the concave, passes through the inflection point c, reaches the second uppermost point, and then falls is defined as $LMw_2$ of the second polymer.

The curve falls from the second uppermost point, further passes through the inflection point d, and converges to the baseline.

In an embodiment of the present invention, the inflection point refers to a point on a curve at which the curve changes from a concave to a convex (concave upward to concave downward) or from a convex to a concave (concave downward to concave upward).

In addition, as an amount by which the second uppermost point can be confirmed, the amount of the second polymer particles is preferably 1 part by mass or more with respect to 100 parts by mass of the first polymer particles.

Furthermore, in the data analysis, when a peak derived from the filter is confirmed, the baseline is set before the peak, and the analyzed data is taken as the molecular weight of the sample.

Measurement model: GPC apparatus HLC-8220GPC manufactured by Tosoh Corporation
Column: "TSKgel Super H3000" manufactured by Tosoh Corporation
Eluent: THF
Temperature: column thermostat 40.0° C.
Flow rate: 0.6 ml/min
Concentration: 0.1 mg/mL (0.1 wt/vol %)
Calibration curve: standard polystyrene sample manufactured by Tosoh Corporation
Injection amount: 100 μL
Solubility: complete dissolution (warmed at 40° C.)
Pre-treatment: filtration through 0.45 μm filter
Detector: differential refractometer (RI)

[Composition of Textile Printing Ink]

The textile printing ink of an embodiment of the present invention contains first polymer particles, second polymer particles, and at least one type of the binding aids. The textile printing ink may further contain a pigment and a solvent.

<First Polymer Particles and Second Polymer Particles>

The first polymer particles and the second polymer particles (hereinafter, also collectively referred to as "polymer particles") are not particularly limited as long as the ratio of the weight average molecular weight described above is satisfied. The glass transition temperature (Tg) of the polymer particles is preferably −35° C. or lower from the viewpoint of binding the pigment and the fiber, and more preferably in a range of −35 to 50° C.

The Tg of each polymer particle can be measured by the following method.

First, polymer particles separated from a synthesized polymer particle dispersion or ink are dried to obtain a sample. This sample is measured by differential scanning calorimetry at a temperature raising rate of 10° C./min in accordance with JIS K7121, and the glass transition temperature can be determined.

The Tg of the polymer particles can be adjusted by the composition of the polymer constituting the polymer particles, the degree of crosslinking, and the like.

In addition, the polymer particles are preferably colorless from the viewpoint of highly reproducing the color of the pigment particles. The colorless polymer particles specifically refer to polymer particles having no UV absorption peak at a wavelength of 400 to 700 nm in an absorption spectrum obtained by UV-Vis spectrometry.

Furthermore, the polymer particles preferably have translucency, and more preferably are transparent. That is, the polymer particles are particularly preferably colorless and transparent.

Such polymer particles are not particularly limited as long at least the ratio of the weight average molecular weight is satisfied. The polymer particles preferably contain, for example, one or more polymers selected from the group consisting of a (meth)acrylic polymer, a polystyrene polymer, an acrylonitrile polymer, a polyester polymer, and an epoxy polymer. Among them, the polymer particles preferably contain a polymer selected from the group consisting of a (meth)acrylic polymer and a polystyrene polymer from the viewpoint of having a Tg of −35° C. or lower and hardly impairing the texture.

((Meth)Acrylic Polymer)

The (meth)acrylic polymer (also referred to as "(meth) acrylic resin") may be a homopolymer of at least one of a (meth)acrylic acid ester and (meth)acrylonitrile, or a copolymer of the homopolymer and another copolymerizable monomer.

The (meth)acrylic acid ester is a monofunctional (meth)acrylic acid ester, and examples thereof include methyl (meth)acrylic, ethyl (meth)acrylic, propyl (meth)acrylic, n-butyl (meth)acrylic, isopropyl (meth)acrylic, isobutyl (meth)acrylate, 2-ethylhexyl (meth)acrylate, and n-hexyl (meth)acrylate, and methyl methacrylate is preferable. (Meth)acrylonitrile is acryloylnitrile or methacryloylnitrile.

The total content of the structural unit derived from a (meth)acrylic acid ester and the structural unit derived from (meth)acrylonitrile may be 50% by mass or more, and preferably 60% by mass or more with respect to the total amount of structural units constituting the polymer.

Another copolymerizable monomer may be another monofunctional vinyl monomer or polyfunctional vinyl monomer (crosslinkable vinyl monomer).

Examples of another monofunctional vinyl monomer include ethylenically unsaturated carboxylic acids (for example, (meth)acrylic acid, maleic acid, and itaconic acid), functional group-containing (meth)acrylates (for example, quaternary ammonium group-containing (meth)acrylates such as trimethylammonium ethyl (meth)acrylate, 2-hydroxyethyl (meth)acrylate, 2-hydroxypropyl (meth)acrylate, and glycidyl (meth)acrylate), acrylamides (for example, acrylamide and diacetone acrylamide), styrenes (for example, styrene, α-methylstyrene, and vinyltoluene), and saturated fatty acid vinyls (for example, vinyl acetate and vinyl propionate). The content of the structural unit derived from another monofunctional vinyl monomer may be 50% by mass or less with respect to the total amount of structural units constituting the polymer.

Examples of the polyfunctional vinyl monomer include vinyl compounds (for example, 1,4-divinyloxybutane and divinylbenzene), allyl compounds (for example, diallyl phthalate and triallyl cyanurate), and polyfunctional (meth)acrylates (for example, ethylene glycol di(meth)acrylate, diethylene glycol di(meth)acrylate, propylene glycol di(meth)acrylate, triethylene glycol di(meth)acrylate, trimethylolpropane tri(meth)acrylate, and pentaerythritol tetra(meth)acrylate).

The content of the structural unit derived from a polyfunctional vinyl monomer may be in a range of 20% by mass or less, and preferably 0.5 to 10% by mass with respect to the total amount of structural units constituting the polymer.

From the viewpoint of making it more difficult to fuse the polymer particles, the acrylic polymer may be crosslinked (that is, the polymer may be a crosslinked acrylic polymer).

The crosslinked acrylic polymer is a copolymer of a monofunctional vinyl monomer containing at least one of a (meth)acrylic acid ester and (meth)acrylonitrile with a monofunctional vinyl monomer. Such a crosslinked (meth)acrylic polymer is less likely to be fused during ink drying and is less likely to form a film.

In the case of the crosslinked acrylic polymer, butyl acrylate or methyl methacrylate is preferably used as the monofunctional vinyl monomer containing at least one of a (meth)acrylic acid ester and (meth)acrylonitrile, and diacetone acrylamide is preferably used as the monofunctional vinyl monomer, for example. In such a case, diacetone acrylamide functions as a binding aid (crosslinkable monomer) according to an embodiment of the present invention.
(Polystyrene Polymer)

The polystyrene polymer (also referred to as "polystyrene resin") may be a homopolymer of a styrene or a copolymer of a styrene and another copolymerizable monomer.

As the styrene, the same styrenes as described above can be used. The amount of the structural unit derived from a styrene may be 50% by mass or more, and preferably 60% by mass or more with respect to the total amount of structural units constituting the polymer. As another copolymerizable monomer, the same copolymerizable monomers as described above can be used.

The polystyrene polymer may be a crosslinked polystyrene polymer. The crosslinked polystyrene polymer is a copolymer of a monofunctional vinyl monomer containing a styrene and a polyfunctional vinyl monomer.

Among them, the polymer particles are preferably particles containing a copolymer of butyl acrylate (BA), methyl methacrylate (MMA), and diacetone acrylamide (DAAM).
(Physical Properties of Polymer Particles)

The acid value of the polymer constituting the polymer particles is not particularly limited as long as the polymer particles can be well dispersed in an aqueous medium. The acid value is, for example, 20 to 140 mgKOH/g, and preferably 30 to 70 mgKOH/g. The acid value can be measured in accordance with JIS K 0070 or ISO 3961. Specifically, the acid value can be measured as the number of mg of potassium hydroxide (KOH) required to neutralize 1 g of a sample.

The average particle size d2 of the first polymer particles and the second polymer particles is not particularly limited. The average particle size d2 is preferably not too small with respect to the average particle size d1 of the pigment particles from the viewpoint of making it difficult for the pigment particles to gather in the gaps between the fibers of the fabric. Specifically, the ratio d2/d1 of the average particle size d2 of the polymer particles to the average particle size d1 of the pigment is preferably 0.5 to 3, and more preferably 1.1 to 2.5.

The average particle size d1 of the pigment means the average particle size of the pigment dispersed in the ink. Specifically, the average particle size d1 means the average dispersed particle size (Z average) of the pigment particles to which a pigment dispersant has been adsorbed when the ink contains the pigment dispersant. The average particle size d1 of the pigment is not particularly limited as long as the injectability in the inkjet method is not impaired, but is preferably 50 to 350 nm and more preferably 70 to 250 nm. The dispersed particle size of the pigment can be measured by a particle size distribution analyzer using dynamic scattering.

The average particle size d1 of the pigment can be adjusted mainly by the size of the pigment particles themselves, but can also be adjusted by the molecular weight and content of the pigment dispersant, the dispersion treatment conditions of the pigment particles, and the like.

The average particle size d2 of the polymer particles is preferably in a range of 30 to 250 nm, and more preferably 60 to 180 nm.

The average particle size d2 of the polymer particles can be measured by a particle size distribution analyzer using dynamic scattering, similarly to the average particle size d1 of the pigment.

Regarding the content ratio between the first polymer particles and the second polymer particles, the second polymer particles are preferably contained in an amount of 1 to 100 parts by mass, more preferably 10 to 70 parts by mass with respect to 100 parts by mass of the first polymer particles.

The ratio M2/M1 of the content M2 of the polymer particles (total content of the first polymer particles and the second polymer particles) to the content M1 of the pigment in the ink is preferably 3 to 19 (mass ratio). When the ratio M2/M1 is 3 or more (mass ratio), the proportion of pigment particles gathering in gaps between fibers of the fabric can be reduced when the ink is applied to the fabric. Therefore, the pigment particles are easily uniformly distributed on the surface of the fiber, and thus a sufficient image density is easily obtained. On the other hand, when the ratio M2/M1 is 19 or less (mass ratio), the proportion of the pigment particles in the ink is not too small. Thus, not only the image density is less likely to decrease, but also the proportion of the polymer particles is not too large, so that the texture is less likely to be impaired. From the same viewpoint, the ratio M2/M1 is more preferably 5 to 17 (mass ratio), and still more preferably 8 to 14 (mass ratio).

Specifically, the content M2 of the polymer particles (total content of the first polymer particles and the second polymer particles) is preferably in a range of 0.1 to 30% by mass, and more preferably 1 to 10% by mass with respect to the amount of the ink.
<Binding Aid>

The "binding aid" according to an embodiment of the present invention refers to crosslinkable monomers contained in respective polymer particles as an aid for linking the first polymer particles and the second polymer particles and a crosslinking agent that is present in the ink outside the polymer particles and has a functional group capable of reacting with the crosslinkable monomers to form a crosslinking bond. The binding aid according to an embodiment of the present invention also includes reactive species having a catalytic action for promoting the crosslinking bond-forming reaction.

The existence state of the binding aid according to an embodiment of the present invention is preferably at least the following three aspects as described above:
(i) the binding aid is completely contained inside the first polymer particles or the second polymer particles, does not appear on the surface of the polymer particles, and can appear on the surface of the polymer particles by an external action;
(ii) a part of a structural portion of the molecule of the binding aid is contained on the surface or inside of the first polymer particles or the second polymer particles, and a structural portion having a crosslinkable group appears on the surface of the particles; and
(iii) the binding aid is contained in the ink outside the first polymer particles or the second polymer particles.

Examples of another binding aid include a reactive species having a catalytic action that promotes the reaction of the crosslinkable polymer and the crosslinking agent.

Among the three aspects, any one may be used as long as the first polymer particles and the second polymer particles can be bonded to each other, but in an embodiment of the present invention, the aspects (ii) and (iii) are preferable.

Specifically, it is preferable that the binding aid (aspect (ii)) is contained in both polymer particles, and another binding aid is contained in the ink rather than in the polymer particles (aspect (iii)).
(Crosslinkable Monomer)

Examples of the binding aid contained in both polymer particles include a crosslinkable monomer.

Here, the "crosslinkable monomer" according to an embodiment of the present invention refers to a monomer that is contained in polymer particles and has a functional group that can be linked (crosslinked) to other polymer particles or a crosslinking agent at at least one site of the molecule, for example, at a terminal portion of the monomer.

The phrase "the crosslinkable monomer is contained in the polymer particles" refers to the above-described existence states (i) and (ii) of the crosslinkable monomer added as a binding aid, and includes a state in which at least one site of the crosslinkable monomer is bonded to the polymer constituting the polymer particles. That is, the above-described existence state includes a state in which the polymer and the crosslinkable monomer, which form a bond, are contained Such a crosslinkable monomer may be a compound having a functional group that can react with at least a crosslinkable group of a crosslinking agent described later. Such a compound is preferably, for example, those having a double bond at a molecular terminal thereof and having a C=O group. Examples thereof include acrylamides and carboxylic acid groups as described above.

Examples of the acrylamides include methylacrylamide, ethylacrylamide, propylacrylamide, butylacrylamide, t-butylacrylamide, t-octylacrylamide, cyclohexylacrylamide, benzylacrylamide, hydroxymethylacrylamide, methoxymethylacrylamide, butoxymethylacrylamide, methoxymethylacrylamide, phenylacrylamide, dimethylacrylamide, diethylacrylamide, β-cyanoethylacrylamide, N-(2-acetoacetoxyethyl)acrylamide, N,N'-methylenebis(acrylamide), and diacetone acrylamide. Among them, N,N'-methylenebis(acrylamide) and diacetone acrylamide (DAAM) are preferable.

Examples of the carboxylic acid group include 1,4-butanediol diacrylate and N,N'-methylenebisacrylamide.

[Chemical Formula 1]

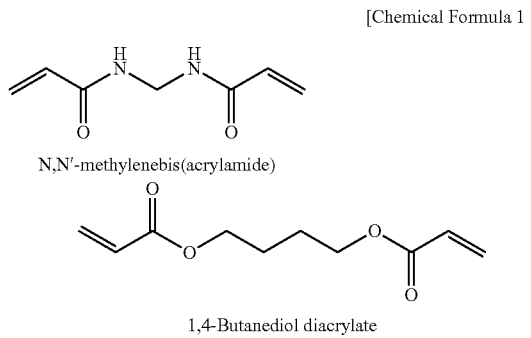

N,N'-methylenebis(acrylamide)

1,4-Butanediol diacrylate

The structural portion derived from the crosslinkable monomer contained in both polymer particles are preferably contained in an amount of 0.1 to 30% by mass, and more preferably 1 to 10% by mass with respect to the amount of both polymer particles (the total amount of the first polymer particles and the second polymer particles).

The "structural portion derived from a crosslinkable monomer contained in both polymer particles" refers to a molecular structural portion other than a group or an atom dissociated in association with a reaction with a constituent of the polymer particles, and a molecular structural portion also including a site where the bonding state of a crosslinkable group is changed by addition polymerization (for example, a double bond is changed to a single bond), among molecular structures of the crosslinkable monomer.

For example, the structural portion derived from a crosslinkable monomer contained in both polymer particles refers to a structural portion of a part of the molecular structure of the crosslinkable monomer, including both a site bonded to a polymer component where a hydrogen atom of the crosslinkable group is dissociated to constitute polymer particles, and a site of the other part of the crosslinkable monomer where the structure of the original molecule is maintained. The structural portion derived from a crosslinkable monomer contained in both polymer particles also includes a state in which the crosslinkable monomer is contained together with the polymer component in the polymer particles while maintaining its original molecular structure.

Crosslinking Agent

The "crosslinking agent" according to an embodiment of the present invention refers to a compound that is present in the ink outside the polymer particles and has at least two functional groups capable of reacting with the crosslinkable monomer to form a crosslinking bond.

Examples of the crosslinking agent that can be used include a compound having a hydrazide group, an oxazoline group, an isocyanate group, an ethyleneimine group, an aziridine group, a carbodiimide group, or a silane coupling group, which can react at normal temperature or low temperature, and a compound having a blocked isocyanate group, a hydrazide group, or a diacetone acrylamide group, which can react by the action of heating, catalysis, or the like.

Specific examples of the crosslinking agent that can be used include compounds having a crosslinkable group, such as an organic acid dihydrazide compound, an oxazoline compound, an isocyanate compound, a blocked isocyanate compound, an epoxy polymer compound, an ethylene urea compound, an ethyleneimine compound, a melamine-based compound, diacetone acrylamide, carbodiimide, and a silane coupling agent.

More specifically, the crosslinking agents described in JP 2020-2220 A, JP 2020-203965 A, JP 2011-256477 A, JP 2011-42912 A, and the like are used as references.

Examples of the crosslinking agent particularly suitably used in an embodiment of the present invention include adipic acid dihydrazide (ADH) and N,N'-methylenebisacrylamide.

[Chemical Formula 2]

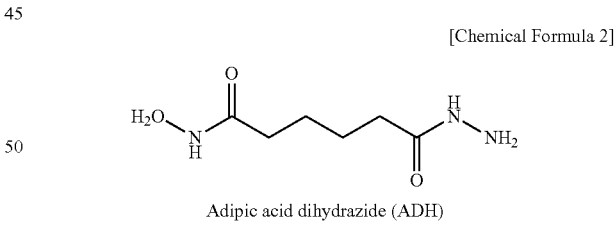

Adipic acid dihydrazide (ADH)

The binding aid contained in the ink is preferably contained in an amount of 0.1 to 3% by mass with respect to the amount of the ink.

<Pigment>

The pigment used in the textile printing ink of an embodiment of the present invention is not particularly limited, but is preferably, for example, organic pigments or inorganic pigments of the following numbers described in the color index.

Examples of orange or yellow pigment include C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I.

Pigment Yellow 74, C.I. Pigment Yellow 83, C.I. Pigment Yellow 93, C.I. Pigment Yellow 94, C.I. Pigment Yellow 128, C.I. Pigment Yellow 138, C.I. Pigment Yellow 151, C.I. Pigment Yellow 154, C.I. Pigment Yellow 155, C.I. Pigment Yellow 180, C.I. Pigment Yellow 185, and C.I. Pigment Yellow 213.

Examples of red or magenta pigment include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257; Pigment Violet 3, 19, 23, 29, 30, 37, 50, and 88; and Pigment Orange 13, 16, 20, and 36.

Examples of blue or cyan pigment include Pigment Blue 1, 15, 15:1, 15:2, 15:3, 15:4, 15:6, 16, 17-1, 22, 27, 28, 29, 36, and 60.

Examples of green pigment include Pigment Green 7, 26, 36, and 50. Examples of yellow pigment include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193.

Examples of black pigment include Pigment Black 7, 28, and 26.

Examples of the commercially available pigment include Chromo Fine Yellow 2080, 5900, 5930, µF-1300, and 2700L, Chromo Fine Orange 3700L and 6730, Chromo Fine Scarlet 6750, Chromo Fine Magenta 6880, 6886, 6891N, 6790, and 6887, Chromo Fine Violet RE, Chromo Fine Red 6820 and 6830, Chromo Fine Blue HS-3, 5187, 5108, 5197, 5085N, SR-5020, 5026, 5050, 4920, 4927, 4937, 4824, 4933GN-EP, 4940, 4973, 5205, 5208, 5214, 5221, and 5000P, Chromo Fine Green 2GN, 2GO, 2G-550D, 5310, 5370, and 6830, Chromo Fine Black A-1103, Seika Fast Yellow 10 GH, A-3, 2035, 2054, 2200, 2270, 2300, 2400(B), 2500, 2600, ZAY-260, 2700(B), and 2770, Seika Fast Red 8040, C405(F), CA120, LR-116, 1531B, 8060R, 1547, ZAW-262, 1537B, GY, 4R-4016, 3820, 3891, and ZA-215, Seika Fast Carmine 6B1476T-7, 1483LT, 3840, and 3870, Seika Fast Bordeaux 10B-430, Seika Light Rose R40, Seika Light Violet B800 and 7805, Seika Fast Maroon 460N, Seika Fast Orange 900 and 2900, Seika Light Blue C718 and A612, Cyanine Blue 4933M, 4933GN-EP, 4940, and 4973 (manufactured by Dainichiseika Color & Chemicals Mfg. Co., Ltd.); KET Yellow 401, 402, 403, 404, 405, 406, 416, and 424, KET Orange 501, KET Red 301, 302, 303, 304, 305, 306, 307, 308, 309, 310, 336, 337, 338, and 346, KET Blue 101, 102, 103, 104, 105, 106, 111, 118, and 124, KET Green 201 (manufactured by DIC Corporation); Colortex Yellow 301, 314, 315, 316, P-624, 314, U10GN, U3 GN, UNN, UA-414, and U263, Finecol Yellow T-13 and T-05, Pigment Yellow1705, Colortex Orange 202, ColortexRed101, 103, 115, 116, D3B, P-625, 102, H-1024, 105C, UFN, UCN, UBN, U3BN, URN, UGN, UG276, U456, U457, 105C, and USN, Colortex Maroon 601, Colortex Brown B610N, Colortex Violet 600, Pigment Red 122, Colortex Blue 516, 517, 518, 519, A818, P-908, and 510, Colortex Green 402 and 403, Colortex Black 702 and U905 (manufactured by Sanyo Color Works, LTD.); Lionol Yellow1405G, Lionol Blue FG7330, FG7350, FG7400G, FG7405G, ES, and ESP-S (manufactured by Toyo Ink Co., Ltd.), Toner Magenta E02, Permanent RubinF6B, Toner Yellow HG, Permanent Yellow GG-02, Hostapeam Blue B2G (manufactured by Hoechst Industry Ltd.); Novoperm P-HG, Hostaperm Pink E, Hostaperm Blue B2G (manufactured by Clariant (Japan) K.K.); Carbon Black #2600, #2400, #2350, #2200, #1000, #990, #980, #970, #960, #950, #850, MCF88, #750, #650, MA600, MA7, MA8, MA11, MA100, MA100R, MA77, #52, #50, #47, #45, #45L, #40, #33, #32, #30, #25, #20, #10, #5, #44, and CF9 (manufactured by Mitsubishi Chemical Corporation).

The pigment is preferably further dispersed with a pigment dispersant from the viewpoint of improving dispersibility in the ink. The pigment dispersant will be described later.

The pigment may be a self-dispersible pigment. The self-dispersible pigment is obtained by modifying the surface of pigment particles with a group having a hydrophilic group, and has pigment particles and a hydrophilic group bonded to the surface of the pigment particles.

Examples of the hydrophilic group include a carboxy group, a sulfonic acid group, and a phosphorus-containing group. Examples of the phosphorus-containing group include a phosphoric acid group, a phosphoric acid group, a phosphinic acid group, a phosphite group, and a phosphate group.

Examples of commercially available products of the self-dispersible pigment include Cab-O-Jet (registered trademark) 200K, 250C, 260M, and 270V (sulfonic acid group-containing self-dispersible pigment), Cab-O-Jet (registered trademark) 300K (carboxylic acid group-containing self-dispersible pigment), and Cab-O-Jet (registered trademark) 400K, 450C, 465M, 470V, and 480V (phosphoric acid group-containing self-dispersible pigment), all manufactured by Cabot Corporation.

The content M1 of the pigment is not particularly limited, and is preferably in a range of 0.3 to 10% by mass with respect to the amount of the ink from the viewpoint of easily adjusting the viscosity of the ink within the above range and allowing an image having a high concentration to be formed. When the content M1 of the pigment is 0.3% by mass or more, a large amount of polymer particles can be contained, so that the color of the obtained image tends to be vivid. When the content M1 is 5% by mass or less, the viscosity of the ink does not become too high, so that the injection stability is hardly impaired. From the same viewpoint, the content M1 of the pigment is more preferably 0.5 to 3% by mass with respect to the amount of the ink.

<Solvent>

The solvent is not particularly limited, but preferably contains water, and preferably further contains a water-soluble organic solvent.

The water may be ion-exchanged water, distilled water, or pure water. The content of water in the ink is preferably in a range of 20 to 60% by mass, and more preferably 30 to 50% by mass.

The water-soluble organic solvent is not particularly limited as long as it is compatible with water. Preferably, the ink is less likely to be thickened by drying, from the viewpoints of causing the ink to easily permeate the fabric and preventing deterioration of the injection stability in the inkjet method. Therefore, the ink preferably contains a high-boiling point solvent having a boiling point of 200° C. or higher.

The high-boiling point solvent having a boiling point of 200° C. or higher may be a water-soluble organic solvent having a boiling point of 200° C. or higher, and is preferably a polyol or a polyalkylene oxide.

Examples of the polyol having a boiling point of 200° C. or higher include dihydric alcohols such as 1,3-butanediol (boiling point: 208° C.), 1,6-hexanediol (boiling point: 223° C.), and polypropylene glycol; and trihydric or higher alcohols such as glycerin (boiling point: 290° C.) and trimethylolpropane (boiling point: 295° C.).

Examples of the polyalkylene oxide having a boiling point of 200° C. or higher include diethylene glycol monoethyl ether (boiling point: 202° C.), triethylene glycol monomethyl ether (boiling point: 245° C.), tetraethylene glycol monomethyl ether (boiling point: 305° C.), tripropylene glycol monoethyl ether (boiling point: 256° C.); ethers of dihydric alcohols such as polypropylene glycol; and ethers of trihydric or higher alcohols such as glycerin (boiling point: 290° C.) and hexanetriol.

The solvent may further contain a solvent other than the high-boiling point solvent. Examples of the other solvent include polyhydric alcohols having a boiling point of lower than 200° C. (for example, ethylene glycol, propylene glycol, and hexanetriol); polyhydric alcohol ethers having a boiling point of lower than 200° C. (for example, ethylene glycol monomethyl ether, ethylene glycol monobutyl ether, diethylene glycol monomethyl ether, diethylene glycol dimethyl ether, propylene glycol monomethyl ether, and propylene glycol monoethyl ether); monohydric alcohols (for example, methanol, ethanol, propanol, pentanol, hexanol, cyclohexanol, and benzyl alcohol); amines (for example, ethanolamine, N-ethyldiethanolamine, morpholine, N-ethylmorpholine, ethylenediamine, diethylenediamine, and triethylenetetramine); amides (for example, formamide, N,N-dimethylformamide, and N,N-dimethylacetamide); heterocycles (for example, 2-pyrrolidone, N-methyl-2-pyrrolidone, N-cyclohexyl-2-pyrrolidone, 2-oxazolidone, and 1,3-dimethyl-2-imidazolidine), sulfoxides (for example, dimethylsulfoxide); and sulfones (for example, sulfolane).

<Other Components>

The textile printing ink of an embodiment of the present invention may further contain other components as necessary. Examples of the other components may include pigment dispersants, surfactants, preservatives, antifungals, and pH regulators.

(Pigment Dispersant)

The pigment dispersant is present in the ink so as to enclose the surface of the pigment particles, or adsorbed to the surface of the pigment particles to form a pigment dispersoid, thereby dispersing the pigment well. Such a pigment dispersant is preferably a polymer dispersant from the viewpoint of excellent dispersibility of the pigment.

Examples of the polymer dispersant include an anionic dispersant and a cationic dispersant.

The anionic dispersant may be a polymer dispersant having a hydrophilic group selected from the group consisting of a carboxylic acid group, a phosphorus-containing group, and a sulfonic acid group. Among them, a polymer dispersant having a carboxylic acid group is preferable.

Examples of the polymer dispersant having a carboxylic acid group include a polycarboxylic acid or a salt thereof. Examples of the polycarboxylic acid include a (co)polymer of monomers selected from acrylic acid or a derivative thereof, maleic acid or a derivative thereof, itaconic acid or a derivative thereof, fumaric acid or a derivative thereof, and salts thereof. Examples of other monomers constituting the copolymer include styrene and vinylnaphthalene.

The anionic group equivalent of the anionic dispersant is not particularly limited as long as the pigment particles can be sufficiently dispersed, but is preferably, for example, in a range of 1.1 to 3.8 meq/g. When the anionic group equivalent is within the above range, high pigment dispersibility is easily obtained without increasing the molecular weight of the anionic dispersant. The anionic group equivalent can be measured by the same method as the method for measuring the acid value.

Examples of the cationic group of the cationic dispersant include a secondary amino group (imino group), a tertiary amino group, and a quaternary ammonium group. The cationic dispersant is not particularly limited as long as it can form a pigment dispersoid as described above, and can be, for example, a cationic polymer (polymer or prepolymer).

Examples of the cationic polymer include a (co)polymer of an ethylenically unsaturated monomer having a cationic group (a tertiary amino group or a quaternary ammonium group).

Examples of the ethylenically unsaturated monomer having a tertiary amino group include dialkylaminoalkyl (meth)acrylates such as dimethyl or diethylaminoethyl (meth)acrylate, and dimethyl or diethylaminopropyl (meth)acrylate; dialkylaminoalkyl (meth)acrylamides such as dimethyl or diethylaminoethyl (meth)acrylamide, and dimethyl or diethylaminopropyl (meth)acrylamide; and (meth)acrylamides such as acrylamide.

Examples of the ethylenically unsaturated monomer having a quaternary ammonium group include (meth)acryloyloxyalkyltrialkylammonium salts such as 2-(meth)acryloyloxyethyltrimethylammonium chloride and 3-(meth)acryloyloxy-2-hydroxypropyltrimethylammonium chloride; (meth)acrylamidoalkyltrialkylammonium salts such as acrylamide-2-(acryloyloxy)methyltrimethylammonium chloride, (3-(meth)acrylamidopropyltrimethylammonium chloride, and 3-(meth)acryloylamino-2-hydroxypropyltrimethylammonium chloride; 2-(meth)acryloyloxyalkylbenzylammonium salts such as 2-(meth)acryloyloxyethylbenzylammonium chloride and 2-(meth)acryloyloxyethyldimethylbenzylammonium chloride; and dialkyldiallylammonium salts such as dimethyldiallylammonium chloride.

The ethylenically unsaturated monomer having a cationic group may be one type or two or more types. For example, an ethylenically unsaturated monomer having a tertiary amino group and an ethylenically unsaturated monomer having a quaternary ammonium group may be copolymerized.

These ethylenically unsaturated monomers having a cationic group may be copolymerized with other monomers. Examples of other monomers include (meth)acrylic acid and esters thereof, allyl ethers, vinyl ethers, aromatic vinyl monomers, vinyl ester monomers, olefin monomers, and diene monomers.

Examples of such a cationic polymer include a dimethylaminoethyl methacrylate polymer, a 2-dimethylamino methacrylate-ethyl methacrylate copolymer, a butyl acrylate-dimethylaminoethyl methacrylate copolymer, an acrylamide-2-(acryloyloxy)methyltrimethylammonium chloride polymer, and a dimethyldiallylammonium chloride-acrylamide copolymer.

The cationic group equivalent of the cationic dispersant is not particularly limited as long as the pigment particles can be sufficiently dispersed, but is preferably, for example, in a range of 1 to 5 meq/g. When the cationic group equivalent is within the above range, high pigment dispersibility is easily obtained without increasing the molecular weight of the cationic dispersant. The cationic group equivalent can be measured by the same method as the method for measuring the amine value.

Among these pigment dispersants, the pigment dispersant contained in the pigment ink is preferably a cationic dispersant, from the viewpoint of eliminating the need for a cationic pre-treatment that is likely to cause dirt or stain and making it easier to maintain color reproducibility for a longer time.

The weight average molecular weight of the polymer dispersant is not particularly limited, but is preferably 5,000 to 30,000. When the weight average molecular weight of the polymer dispersant is 5,000 or more, the pigment particles are easily sufficiently dispersed. When the weight average molecular weight is 30,000 or less, the ink is not excessively thickened, so that the permeability of the ink into the fabric is hardly impaired. The weight average molecular weight of the polymer dispersant can be measured in terms of styrene by gel permeation chromatography.

The content of the polymer dispersant is not particularly limited as long as the pigment particles are sufficiently dispersed, and a viscosity that does not impair the permeability of the ink into the fabric is provided. The content is preferably in a range of 20 to 100% by mass, and more preferably 25 to 60% by mass with respect to the amount of the pigment.

(Surfactant)

The textile printing ink of an embodiment of the present invention may further contain a surfactant as necessary.

The surfactant may reduce the surface tension of the ink to increase the wettability of the ink to the fabric. The type of surfactant is not particularly limited, and may be, for example, an acetylene glycol-based surfactant, a silicone-based surfactant, or a fluorine based surfactant.

(Preservative and Antifungal)

Examples of the preservative or antifungal include aromatic halogen compounds (for example, Preventol CMK), methylene dithiocyanate, halogen-containing nitrogen sulfur compound, and 1,2-benzisothiazolin-3-one (for example, PROXEL GXL).

(pH Regulator)

Examples of the pH regulator include citric acid, sodium citrate, hydrochloric acid, and sodium hydroxide.

<Physical Properties of Ink>

The viscosity of the textile printing ink of an embodiment of the present invention at 25° C. is not particularly limited as long as the injectability in the inkjet method is improved. The viscosity is preferably in a range of 3 to 20 mPa·s, and more preferably 4 to 12 mPa·s.

The viscosity of the ink can be measured at 25° C. by an E-type viscometer.

[Preparation of Ink]

The textile printing ink of an embodiment of the present invention can be produced by any method.

For example, the textile printing ink of an embodiment of the present invention can be produced by 1) mixing a pigment, a pigment dispersant, and a solvent (such as water) to obtain a pigment dispersion; and 2) further mixing the obtained pigment dispersion, a dispersion containing first polymer particles, a dispersion containing second polymer particles, a binding aid (for example, a crosslinking agent contained in the ink), and any other components (for example, a surfactant and a high-boiling point solvent). As a result, an ink in which the pigment is well dispersed is easily obtained.

The dispersion containing first polymer particles and the dispersion containing second polymer particles are prepared, for example, as follows. An activator solution prepared by dissolving an anionic activator and sodium carbonate in ion-exchanged water is heated. Monomers of each of polymers constituting respective polymer particles are mixed with a crosslinkable monomer and a water-soluble chain agent to prepare a monomer solution. Thereafter, a solution prepared by dissolving a polymerization initiator in ion-exchanged water is heated. The prepared monomer solution is mixed with the solution to prepare a dispersion of polymer particles.

[Image Forming Method]

An image forming method (textile printing method) according to an embodiment of the present invention includes a step of applying droplets of the textile printing ink of an embodiment of the present invention onto a fabric by an inkjet method.

Specifically, the image forming method includes 1) a step of ejecting ink from an inkjet recording head to apply ink droplets onto a fabric (ink application step), and 2) a step of drying and fixing the ink applied to the fabric (drying and fixing step).

Regarding Step 1) (Ink Application Step)

Ink is ejected from an inkjet recording head to apply ink droplets onto a fabric.

The type of fiber material constituting the fabric is not particularly limited, and examples thereof include natural fibers such as cotton (cellulose fibers), hemp, wool, and silk. The fiber material preferably contains chemical fibers such as rayon, vinylon, nylon, acrylic, polyurethane, polyester, and acetate. The fabric may be those obtained by forming these fibers into any form such as a woven fabric, a nonwoven fabric, or a knitted fabric. The fabric may be a blended woven fabric or a blended nonwoven fabric of two or more types of fibers.

For example, when the ink contains an anionic dispersant, the fabric preferably has a cationic group or an acid group at least on the surface thereof, from the viewpoint of enhancing the adsorption rate and fixability of the pigment. The fabric having at least a cationic group or an acid group on the surface thereof may be a pre-treated fabric or a non-pre-treated fabric.

When the ink contains a cationic dispersant, the fabric preferably has an anionic group at least on the surface thereof, from the viewpoint of enhancing the adsorption rate and fixability of the pigment. That is, a fabric containing fibers having an anionic group (for example, cotton or polyester having an anionic group) has an anionic group as it is, and thus it is not necessarily to impart an anionic group to the fabric by pre-treatment. On the other hand, a fabric containing no fibers having an anionic group does not have an anionic group as it is, and thus it is preferable to impart an anionic group to the fabric by pre-treatment.

In an embodiment of the present invention, when the ink is applied to the fabric, the polymer particles contained in the ink gather to some extent in gaps between the fibers. As a result, the pigment particles are less likely to excessively gather in the gaps between the fibers, and are likely to be uniformly distributed on the surface of the fiber.

Regarding Step 2) (Drying and Fixing Step)

In the drying step, the ink applied to the fabric is dried to remove the solvent component in the ink. Thereby, the pigment is fixed to the fabric.

The drying method is not particularly limited, and may be a method using, for example, a heater, a hot air drying machine, and a heating roller. Among them, it is preferable to heat and dry both surfaces of the fabric by a hot air drying machine and a heater.

The drying temperature and the drying time are preferably set to such a degree that the polymer particles are kept from forming a film while the solvent component in the ink is evaporated. Specifically, the drying temperature is preferably (Tg+50°) C. or lower (Tg means the Tg of the polymer particles). The drying temperature may be room temperature. The drying time may be, although depending on the drying temperature, for example, approximately 0.5 to 30 minutes.

In an embodiment of the present invention, the Tg of the polymer particles applied to the fabric is appropriately high. Thus, fusion of the polymer particles is less likely to excessively proceed during drying of the ink, and film formation of the polymer particles is less likely to occur. As a result, the fibers are not bonded to each other, and gaps therebetween are retained. Thus, an image-formed product (also referred to as "textile printed fabric" or "textile printed product") can be made less hard.

Further, the image forming method according to an embodiment of the present invention may further include 3) a step of pre-treating the fabric (pre-treatment step) as necessary.

Regarding Step 3) (Pre-Treatment Step)

In the pre-treatment step, a pre-treatment agent is applied to the fabric.

The type of pre-treatment agent is not particularly limited, and may be selected according to the composition of the ink. For example, when the ink contains an anionic dispersant, the pre-treatment agent is preferably a pre-treatment agent containing a compound having an acid group or a cationic group. When the ink contains a cationic dispersant, the pre-treatment agent is preferably an anionic pre-treatment agent containing a compound having an anionic group.

The compound having an anionic group is not particularly limited, and may be the same as the anionic surfactant, or may be a polymer compound having an anionic group, or the like. Examples of the polymer compound having an anionic group include plant skins such as pectic acid; cellulose derivatives such as carboxymethyl cellulose; processed starches such as carboxymethyl starch and carboxyethyl starch; and synthesized starches of acrylic polymers containing acrylic acid as a copolymer component, such as an acrylic acid-acrylic acid ester copolymer and a styrene-acrylic acid copolymer.

The pre-treatment agent may further contain a pH regulator, a preservative, and the like as necessary. As the preservative, those similar to those mentioned as the preservative of the ink for inkjet textile printing can be used.

The method for applying the pre-treatment agent to the fabric is not particularly limited, and may be, for example, a pad method, a coating method, a spraying method, or an inkjet method.

The pre-treatment agent applied to the fabric can also be heated and dried by hot air, a hot plate, or a heat roller.

Natural impurities (oils and fats, waxes, pectin, natural pigments, and the like) attached to the fabric fibers, residues of a chemical used in the production process of the fabric (such as glue), dirt attached to the fabric, or the like may be cleaned before applying the pre-treatment agent to the fabric, from the viewpoint of easily obtaining a uniform image.

The obtained image-formed product includes a fabric and an image layer disposed on a surface thereof.

The image layer includes a dried ink containing pigment particles and polymer particles. In the dried ink, most of the polymer particles do not form a film, and at least some of the polymer particles retain their particle shape, and fibers of the fabric are not bonded to each other. As a result, the image-formed product is less likely to be hard, and the texture of the fabric can be favorably maintained.

EXAMPLES

Hereinafter, an embodiment of the present invention will be described in detail with reference to Examples, but the present invention is not limited thereto. In the following Examples, unless otherwise specified, operations were performed at room temperature (25° C.). Unless otherwise specified, "%" and "part" mean "% by mass" and "part by mass", respectively.

1. Materials of Ink (1) Preparation of Polymer Particle Dispersion (Preparation of Polymer Particle Dispersion A)

An activator solution prepared by dissolving 1.68 g of an anionic activator (sodium dodecylbenzene sulfonate: SDS) and 0.34 g of sodium carbonate in 554 g of ion-exchanged water in advance was charged into a separable flask equipped with a stirrer, a temperature sensor, a cooling tube, and a nitrogen introduction device. The internal temperature was raised to 80° C. while stirring the mixture at a stirring speed of 330 rpm under a nitrogen stream.

Meanwhile, 99.75 g (71.25 parts by mass) of n-butyl acrylate (BA), 33.25 g (23.75 parts by mass) of methyl methacrylate (MMA), 7.0 g (5 parts by mass) of diacetone acrylamide (DAAM) as a crosslinkable monomer, and 0.07 g (0.0005 parts by mass) of 1-octanethiol (NOM) as a water-soluble chain transfer agent were dissolved to prepare a monomer solution.

Subsequently, a solution prepared by dissolving 0.14 g (0.001 parts by mass) of a polymerization initiator (potassium persulfate: KPS) in 2.66 g of ion-exchanged water was added and heated at 80° C. Then, the prepared monomer solution was added dropwise over 60 minutes with stirring to prepare polymer fine particles.

Furthermore, after completion of the dropwise addition, the mixture was heated with stirring for 60 minutes. Then, a solution obtained by dissolving 0.14 g of a polymerization initiator (potassium persulfate: KPS) in 2.66 g of ion-exchanged water was further added. The mixture was stirred for 60 minutes, and cooled to 40° C. to obtain a dispersion of polymer fine particles (polymer particle dispersion A).

The parts by mass of KPS described in Table I indicate the parts by mass of KPS added at the first time.

(Preparation of Polymer Particle Dispersions B to H)

Each of polymer particle dispersions B to H was obtained in the same manner as in the preparation of the polymer particle dispersion A except that n-butyl acrylate (BA), methyl methacrylate (MMA), diacetone acrylamide (DAAM), potassium persulfate (KPS) added at the first time, and 1-octanethiol (NOM) were blended so as to be parts by mass as shown in Table I below.

(Preparation of Polymer Particle Dispersion I)

Super Flex 840 (manufactured by DKS Co. Ltd.) as a dispersion of polyurethane resin particles was used as the polymer particle dispersion I.

(Measurement of Weight Average Molecular Weight of Polymer Particles)

The weight average molecular weight of polymer particles in each of the polymer particle dispersions prepared above was measured.

Specifically, the synthesized polymer particle dispersion was dried and dissolved in tetrahydrofuran (THF) so as to be a 1% solution. Then, the dissolved 1% THF solution was passed through a membrane filter having a pore size of 0.45 μm to prepare a sample solution (sample).

Thereafter, using the following GPC apparatus and column, THF as a carrier solvent (eluent) was allowed to flow at a flow rate of 0.6 mL/min while maintaining the column temperature at 40° C. Together with the carrier solvent, 100 μL of the prepared sample solution was injected into the GPC apparatus, and the sample was detected using a differential refractive index detector (RI detector). Then, the molecular weight distribution of the sample was calculated using the calibration curve measured using ten samples of monodispersed polystyrene standard particles.

Measurement model: GPC apparatus HLC-8220GPC manufactured by Tosoh Corporation
    Column: "TSKgel Super H3000" manufactured by Tosoh Corporation
    Eluent: THF
    Temperature: column thermostat 40.0° C.
    Flow rate: 0.6 ml/min
    Concentration: 0.1 mg/mL (0.1 wt/vol %)
    Calibration curve: standard polystyrene sample manufactured by Tosoh Corporation
    Injection amount: 100 μL
    Solubility: complete dissolution (warmed at 40° C.)
    Pre-treatment: filtration through 0.45 μm filter
    Detector: differential refractometer (RI)

(Measurement of Glass Transition Temperature of Polymer Particles)

The glass transition temperature (Tg) of polymer particles in each of the polymer particle dispersions prepared above was measured.

Specifically, a sample obtained by drying the synthesized polymer particle dispersion was measured using "DSC 7000X" manufactured by Hitachi High-Tech Science Corporation. The sample was measured at a temperature raising rate of 10° C./min to determine the glass transition temperature.

(Measurement of Average Particle Size d2 of Polymer Particles)

The dispersed particle size (Z average) of polymer particles in each of the polymer particle dispersions prepared above was measured by Zataizer NanoS 90 manufactured by Malvern Instruments Ltd., and was defined as an average particle size d2.

(3) Other Components

OLFINE E-1010 (acetylene glycol-based surfactant manufactured by Nissin Chemical Co., Ltd.)
    Proxel GXL (preservative manufactured by Lonza Japan Ltd.)
    Ethylene glycol
    Propylene glycol
    Glycerin
    Ion-exchanged water
    Adipic acid dihydrazide (ADH)

2. Preparation of Ink (Preparation of Ink 1)

Next, the following components were mixed to make a total of 100 parts by mass, thereby obtaining an ink 1.

Anionic pigment dispersion (pigment concentration: 15% by mass): 10 parts by mass (solid concentration: 1.5 parts by mass)
    Polymer particle dispersion A (solid concentration: 30% by mass): 24 parts by mass (solid concentration: 7.2 parts by mass)
    Polymer particle dispersion F (solid concentration: 30% by mass): 6 parts by mass (solid concentration: 1.8 parts by mass)
    Adipic acid dihydrazide (ADH): 0.7 parts by mass
    Ethylene glycol: 30 parts by mass
    Propylene glycol: 10 parts by mass
    Glycerin: 10 parts by mass
    OLFINE E 1010 (acetylene glycol-based surfactant manufactured by Nissin Chemical Co., Ltd.): 0.5 parts by mass
    Proxel GXL (manufactured by Lonza Japan Ltd.): 0.5 parts by mass
    Ion-exchanged water: balance (8.3 parts by mass)

TABLE 1

TABLE I

| Polymer particle dispersion No. | Monomer BA [part by mass] | Monomer MMA [part by mass] | Crosslinkable monomer DAAM [part by mass] | Polymerization initiator KPS [part by mass] | Chain transfer agent NOM [part by mass] | Polymer particles Mw | Tg [° C.] | Average particle size [nm] |
|---|---|---|---|---|---|---|---|---|
| A | 71.25 | 23.75 | 5 | 0.001 | 0.0005 | 1200000 | −40 | 80 |
| B | 85 | 10 | 5 | 0.001 | 0.0005 | 1050000 | −50 | 85 |
| C | 65 | 25 | 10 | 0.001 | 0.0005 | 1100000 | −40 | 89 |
| D | 71.25 | 23.75 | 5 | 0.006 | 0.0075 | 500000 | −40 | 83 |
| E | 71.25 | 23.75 | 5 | 0.001 | 0 | 2000000 | −40 | 91 |
| F | 71.25 | 23.75 | 5 | 0.006 | 0.075 | 80000 | −40 | 76 |
| G | 73 | 27 | 0 | 0.001 | 0.0005 | 1200000 | −40 | 90 |
| H | 73 | 27 | 0 | 0.006 | 0.075 | 80000 | −40 | 77 |
| I | Urethane resin | | | | | 50000 | −20 | 150 |

(2) Preparation of Anionic Pigment Dispersion

First, 78 parts by mass of water was mixed with 7 parts by mass of a styrene-butyl acrylate-methacrylic acid copolymer (anionic dispersant, weight average molecular weight: 16,000, anionic group equivalent: 3.5 meq/g) as a pigment dispersant. Then, the mixture was heated with stirring to prepare a neutralized product of the pigment dispersant. Then, 15 parts by mass of C.I. Pigment Blue 15:3 was added to this mixed solution, and this was premixed and then dispersed using a sand grinder filled with 0.5 mm zirconia beads at a volume ratio of 50% to obtain a cyan pigment dispersion having a pigment concentration of 15% by mass.

The dispersed particle size of the polymer particles in the obtained ink was almost the same as the dispersed particle size of the polymer particles in the polymer particle dispersion.

(Preparation of Inks 2 to 9)

Inks 2 to 9 were obtained by mixing the respective components in the same manner as in the preparation of the ink 1 except that the type and content ratio of the polymer particle dispersion were changed as shown in the following Table II. The "content ratio" shown in Table II is a mass ratio of each polymer particle dispersion.

3. Evaluation
(Image Forming Test)

An image forming test was performed using the obtained ink.

First, an inkjet head (Konica Minolta head #204) was prepared as an image forming device. Then, the ink described in Table II was ejected from a nozzle of the inkjet head of the image forming device to form an image on a cotton fabric as a fabric. Specifically, an image was formed by the following procedure.

(Ink Application Step)

The obtained ink was set to the image forming device. Then, a solid image was formed on the above fabric by using the obtained ink with a resolution of 540 dpi (main scanning)×720 dpi (sub-scanning). Note that dpi represents the number of ink droplets (dots) per 2.54 cm. The ejecting frequency was 22.4 kHz.

(Drying Step)

The fabric to which the ink has been applied was dried by a belt-conveying type dryer at 120° C. for 5 minutes.

(Evaluation)

The color reproducibility, the texture (hardness), the stickiness, and the fastness to rubbing of the obtained image-formed product when an image forming test was performed using each ink were evaluated by the following methods.

(Color Reproducibility)

The obtained image-formed product was visually evaluated for color reproducibility. Visual evaluation was performed according to the following criteria.

⊙: Excellent color density and color vividness.
○: Slightly low color density or slightly poor color vividness, but a good level.
Δ: Slightly low color density or slightly poor color vividness, but a level at which there is no problem in practical use.
x: Low color density or dull, which is a level at which there is a problem in practical use.

If the evaluation result is equal to or more than the case of Δ, it is defined as an acceptable range.

(Texture)

The obtained image-formed product was subjected to sensory evaluation by touching with a hand, and evaluated according to the following criteria.

⊙: Soft, and the boundary between the printed surface and the fabric cannot be seen.
○: Soft, but the boundary between the printed surface and the fabric can be seen.
Δ: Not stiff, but the boundary between the printed surface and the fabric can be clearly seen.
x: Stiff and firm feel.

If the evaluation result is equal to or more than the case of ○, it is defined as an acceptable range.

(Stickiness)

The obtained image-formed product was subjected to sensory evaluation by touching with a hand, and evaluated according to the following criteria.

⊙: There is no problem in touch feeling.
○: There is a feeling of printing as feeling, but there is no problem.
Δ: There is a feeling of polymer as a touch feeling.
x: Sticky as a touch feeling.

If the evaluation result is equal to or more than the case of Δ, it is defined as an acceptable range.

(Fastness to Rubbing)

Each image-formed product was left for 1 month under conditions of 25° C. and 50% RH using a xenon lamp (Super Xenon Weather Meter SX 75, Suga Test Instruments Co., Ltd.). Thereafter, reciprocations were performed 100 times under conditions of a load of 200.0 g and a speed of 10.0 cm/s by a Gakushin-type rubbing fastness tester (product name: AB-301, manufactured by Tester Sangyo Co., Ltd.). Thereafter, a white fabric for staining of color fastness test (JIS L 0803: 2011, No. 3-1) was impregnated with pure water, and the optical density value of the dye transfer density (hereinafter, also referred to as "OD value of dye transfer density") thereof was measured. The fastness to rubbing was evaluated according to the following evaluation criteria. A lower OD value of dye transfer density indicates excellent fastness to wet rubbing.

⊙: The OD value of dye transfer density is 0.15 or less.
○: The OD value of dye transfer density is more than 0.15 and 0.20 or less.
Δ: The OD value of dye transfer density is more than 0.20 and 0.25 or less.
x: The OD value of dye transfer density is more than 0.25.

If the evaluation result is equal to or more than the case of Δ, it is defined as an acceptable range.

TABLE 2

TABLE II

| Ink No. | Polymer particle dispersion No. Type | Polymer particle dispersion Content ratio | Polymer particle dispersion No. Type | Polymer particle dispersion Content ratio | Ratio of weight average molecular weight (LMw/HMw) | Crosslinkable monomer | Evaluation Color reproducibility | Evaluation Texture | Evaluation Stickiness | Evaluation Fastness to rubbing | Note |
|---|---|---|---|---|---|---|---|---|---|---|---|
| 1 | A | 80 | F | 20 | 0.07 | DAAM | ⊙ | ⊙ | ⊙ | ⊙ | Present invention |
| 2 | B | 80 | F | 20 | 0.07 | DAAM | ⊙ | ⊙ | ⊙ | ⊙ | Present invention |
| 3 | C | 80 | F | 20 | 0.07 | DAAM | ⊙ | ⊙ | ⊙ | ⊙ | Present invention |
| 4 | D | 80 | F | 20 | 0.16 | DAAM | ⊙ | ⊙ | ⊙ | ○ | Present invention |
| 5 | D | 60 | F | 40 | 0.16 | DAAM | ⊙ | ⊙ | ⊙ | ○ | Present invention |
| 6 | E | 80 | F | 20 | 0.04 | DAAM | ⊙ | ○ | ⊙ | ⊙ | Present invention |

TABLE 2-continued

TABLE II

| Ink No. | Polymer particle dispersion No. Type | Polymer particle dispersion No. Content ratio | Polymer particle dispersion No. Type | Polymer particle dispersion No. Content ratio | Ratio of weight average molecular weight (LMw/HMw) | Crosslinkable monomer | Evaluation Color reproducibility | Texture | Stickiness | Fastness to rubbing | Note |
|---|---|---|---|---|---|---|---|---|---|---|---|
| 7 | A | 100 | — | — | — | DAAM | ◎ | X | ◎ | ◎ | Comparative Example |
| 8 | G | 80 | H | 20 | 0.07 | — | ◎ | ◎ | X | X | Comparative Example |
| 9 | I | 100 | — | — | — | — | ◎ | ◎ | ◎ | X | Comparative Example |

The above results show that use of the ink of an embodiment of the present invention can prevent stickiness, provide good fastness to rubbing, and improve color reproducibility and texture.

According to an embodiment of the present invention, it is possible to provide a textile printing ink that can prevent stickiness, has good fastness to rubbing, and can improve color reproducibility and texture.

The expression mechanism or action mechanism of the effect of an embodiment of the present invention is not clear, but is presumed as follows.

In general, it is desirable to use high-molecular weight polymer particles in order to bind the pigment and the fiber because the high-molecular weight polymer particles are sticky and hardly peeled off. After dyeing, polymer particles are crosslinked in order to suppress stickiness, but when the high-molecular weight polymer particles are crosslinked, the strength of the polymer is increased, impairing the texture.

In light of this, first polymer particles and second polymer particles are mixed at a specific ratio of the weight average molecular weight, that is, high-molecular weight polymer particles as the first polymer particles and low-molecular weight polymer particles as the second polymer particles are mixed to bond these polymer particles. This reduces network structure due to bonding between the high-molecular weight polymer particles, and thus secures softness (texture) and color reproducibility.

In addition, an advantage of bonding high-molecular weight polymer particles and low-molecular weight polymer particles (that is, the post crosslinking) is to provide a function of bonding the pigment and the fiber before crosslinking. Furthermore, when polymer particles, which are sticky as they are, are crosslinked to be an ultrahigh-molecular weight polymer, the stickiness thereof can be prevented after crosslinking, so that the fastness to rubbing is improved.

Here, the crosslinking reaction mechanism of the high-molecular weight polymer particles and the low-molecular weight polymer particles will be described.

The reaction mechanism described below is a mechanism in which crosslinkable monomers contained in the high-molecular weight polymer particles and the low-molecular weight polymer particles react with a crosslinking agent contained in the ink.

For example, when monomers constituting the basic skeleton of the polymers contained in the high-molecular weight polymer particles and the low-molecular weight polymer particles are butyl acrylate (BA) and methyl methacrylate (MMA), and the crosslinkable monomer is diacetone acrylamide (DAAM), if a crosslinking agent (adipic acid dihydrazide (ADH)) is dissolved in the ink, in the drying step, the ADH and the crosslinkable functional group derived from the crosslinkable monomer (DAAM) in each polymer particle react with each other, and the high-molecular weight polymer particles and the low-molecular weight polymer particles are bonded to each other. This can prevent the stickiness of the surface of the fabric, and ensure the improvement in the fastness to rubbing and the texture and color reproducibility as described above.

In this reaction mechanism, although not illustrated, a basic skeleton (for example, BA-MMA) constituting the polymer particle is bonded to a structural portion derived from DAAM.

[Chemical Formula 3]

<Structure of polymer particles>

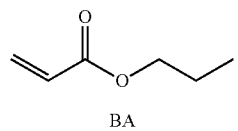
BA

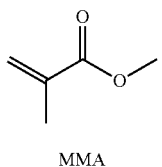
MMA

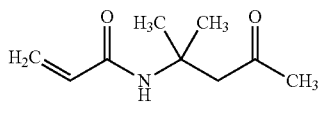
Crosslinkable monmer DAAM

<Reaction mechanism>

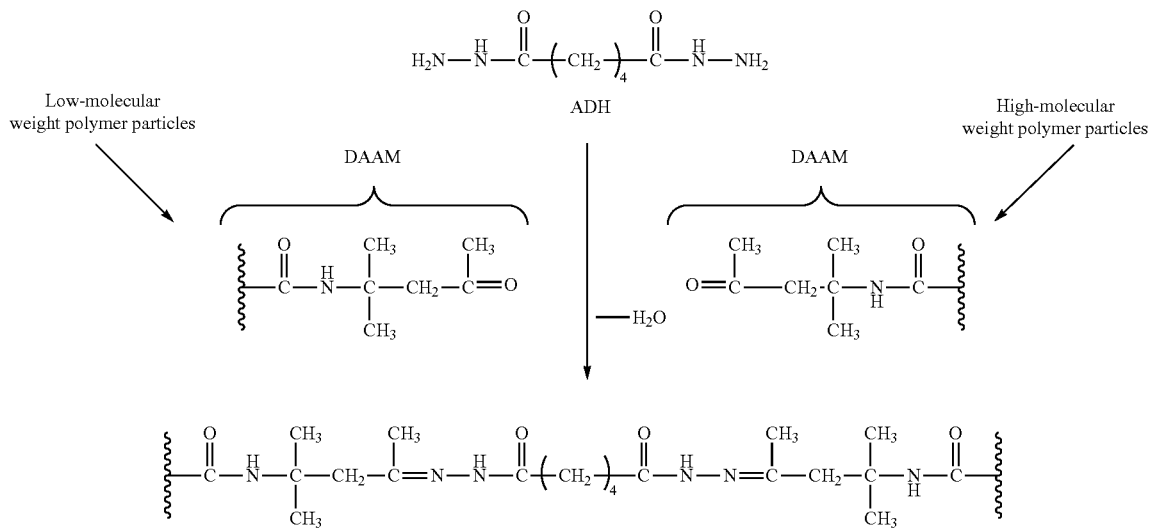

Although embodiments of the present invention have been described and illustrated in detail, the disclosed embodiments are made for purposes of illustration and example only and not limitation. The scope of the present invention should be interpreted by terms of the appended claims

What is claimed is:

1. A textile printing ink comprising polymer particles, the textile printing ink containing
first polymer particles;
second polymer particles having a weight average molecular weight different from a weight average molecular weight of the first polymer particles; and
a binding aid that crosslinks the polymer particles, on a surface, inside, or outside of the first polymer particles and the second polymer particles, wherein when a weight average molecular weight of a polymer contained in the first polymer particles is denoted by $HMw_1$ and a weight average molecular weight of a polymer contained in the second polymer particles is denoted by $LMw_2$, a ratio ($LMw_2/HMw_1$) of the weight average molecular weight of the polymer of the second polymer particles to the weight average molecular weight of the polymer of the first polymer particles is in a range of 0.01 to 0.20.

2. The textile printing ink according to claim 1, wherein the second polymer particles are contained in an amount of 1 to 100 parts by mass with respect to 100 parts by mass of the first polymer particles.

3. The textile printing ink according to claim 1, wherein glass transition temperatures (Tg) of the first polymer particles and the second polymer particles are −35° C. or lower.

4. The textile printing ink according to claim 1, wherein the binding aid is a crosslinkable monomer contained in each of the first polymer particles and the second polymer particles, and a crosslinking agent contained in the textile printing ink.

5. The textile printing ink according to claim 1, wherein the first polymer particles and the second polymer particles each contain a structural portion derived from a crosslinkable monomer, and
the structural portion derived from a crosslinkable monomer is contained in an amount of 0.1 to 30% by mass with respect to a total amount of the first polymer particles and the second polymer particles.

6. The textile printing ink according to claim 1, wherein average particle sizes of the first polymer particles and the second polymer particles are in a range of 30 to 250 nm.

7. The textile printing ink according to claim 1, wherein the textile printing ink contains the first polymer particles and the second polymer particles in an amount of 0.1 to 30% by mass.

* * * * *